US011250238B2

(12) United States Patent
Ju et al.

(10) Patent No.: US 11,250,238 B2
(45) Date of Patent: Feb. 15, 2022

(54) ELECTRONIC DEVICE AND METHOD FOR RECOGNIZING FINGERPRINT BASED ON SENSOR-TO-FINGER DISTANCE

(71) Applicant: Samsung Electronics Co., Ltd., Gyeonggi-do (KR)

(72) Inventors: Wanjae Ju, Gyeonggi-do (KR); Nurimaka Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/953,484

(22) Filed: Nov. 20, 2020

(65) Prior Publication Data
US 2021/0150179 A1    May 20, 2021

(30) Foreign Application Priority Data

Nov. 20, 2019    (KR) ..................... 10-2019-0149330

(51) Int. Cl.
    *G06K 9/62*    (2006.01)
    *G06K 9/00*    (2006.01)
    *G06K 9/46*    (2006.01)

(52) U.S. Cl.
    CPC ........... *G06K 9/0008* (2013.01); *G06K 9/001* (2013.01); *G06K 9/0004* (2013.01); *G06K 9/00926* (2013.01); *G06K 9/4661* (2013.01)

(58) Field of Classification Search
    CPC ......... G06K 9/00006–9/0012; G06K 9/00926; G06K 9/0004
    See application file for complete search history.

(56) References Cited

U.S. PATENT DOCUMENTS

| 10,116,886 | B2 | 10/2018 | Reinhold et al. |
| 2006/0153431 | A1* | 7/2006 | Ando ................. G06K 9/00067 382/124 |
| 2017/0343341 | A1* | 11/2017 | Pang ....................... G01B 7/06 |
| 2018/0276439 | A1 | 9/2018 | Strohmann et al. |
| 2018/0357460 | A1* | 12/2018 | Smith ................. H01L 27/3227 |
| 2019/0303640 | A1 | 10/2019 | Song et al. |

(Continued)

FOREIGN PATENT DOCUMENTS

| CN | 105426087 A | 3/2016 |
| CN | 109144254 A | 1/2019 |

(Continued)

OTHER PUBLICATIONS

International Search Report dated Mar. 8, 2021.

*Primary Examiner* — Brian Werner
(74) *Attorney, Agent, or Firm* — Cha & Reiter, LLC

(57) ABSTRACT

An electronic device and method are disclosed. The electronic device includes a cover glass, a display panel, a fingerprint sensor, and a processor. The processor implements the method, including: obtaining, through a fingerprint sensor, a fingerprint image from an external object contacting a surface of the electronic device, detecting, using a processor, a feature point of the fingerprint image, comparing the detected feature point of the fingerprint image with a feature point of a pre-stored reference image, detecting a variation in a distance between the surface of the electronic device and the fingerprint sensor based on a result of the comparison, and recognizing the fingerprint based on the detected variation in the distance.

20 Claims, 9 Drawing Sheets

(56) References Cited

U.S. PATENT DOCUMENTS

2021/0004554 A1* 1/2021 Kobayashi ............ A61B 5/0077
2021/0142024 A1* 5/2021 Wang .................... G06K 9/0002

FOREIGN PATENT DOCUMENTS

| CN | 109478083 A | 3/2019 |
|---|---|---|
| KR | 10-2006-0064710 A | 6/2006 |
| KR | 10-2017-0119623 A | 10/2017 |
| KR | 10-2018-0044843 A | 5/2018 |
| KR | 10-2019-0088679 A | 7/2019 |

* cited by examiner

ELECTRONIC DEVICE AND METHOD FOR RECOGNIZING FINGERPRINT BASED ON SENSOR-TO-FINGER DISTANCE

CROSS-REFERENCE TO RELATED APPLICATION(S)

This application is based on and claims priority under 35 U.S.C. § 119 to Korean Patent Application No. 10-2019-0149330, filed on Nov. 20, 2019, in the Korean Intellectual Property Office, the disclosure of which is incorporated by reference herein its entirety.

BACKGROUND

1. Field

The disclosure relates to fingerprint-detection in electronic devices, and more particularly, to improving fingerprint-detection by accounting for distance variations between the user's member and the fingerprint sensor.

2. Description of Related Art

Recently, there has been proliferation in development and usage of various types of electronic devices. In particular, multi-function mobile devices, such as desktop PCs, smartphones, tablet PCs, and wearable devices, have become popular and widespread. These widespread electronic devices are often equipped with various types of sensors to perform a variety of functions. In particular, many recent electronic devices include fingerprint sensors capable of detecting a fingerprint of a user, which may be leveraged in association with security, user authentication and locking/unlocking functions.

The above information is presented as background information only to assist with an understanding of the disclosure. No determination has been made, and no assertion is made, as to whether any of the above might be applicable as prior art with regard to the disclosure.

SUMMARY

An aspect of the disclosure is to provide an electronic device and method for recognizing a variation in distance between an object contacting a display panel of an electronic device that includes a fingerprint sensor, and recognizing a fingerprint based on the variation in the distance.

In accordance with another aspect of the disclosure, an electronic device may include a cover glass, a display panel disposed under the cover glass, a fingerprint sensor disposed under the display panel, and a processor operatively connected to the display panel and the fingerprint sensor. The processor may obtain a fingerprint image from an external object contacting a surface of the electronic device through the fingerprint sensor, detect a feature point of the fingerprint image, compare the detected feature point of the fingerprint image with a reference feature point from a pre-stored reference image, detect a variation in a distance between the surface and the fingerprint sensor, based on a result of the comparison, and recognize a fingerprint based on the detected variation in the distance.

In accordance with another aspect of the disclosure, a method in an electronic device is disclosed, including: obtaining, through a fingerprint sensor, a fingerprint image from an external object contacting a surface of the electronic device, detecting, using a processor, a feature point of the fingerprint image, comparing the detected feature point of the fingerprint image with a feature point of a pre-stored reference image, detecting a variation in a distance between the surface of the electronic device and the fingerprint sensor based on a result of the comparison, and recognizing the fingerprint based on the detected variation in the distance.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

In the following description made with respect to the accompanying drawings, similar components will be assigned with similar reference numerals.

DETAILED DESCRIPTION

Figure 1:
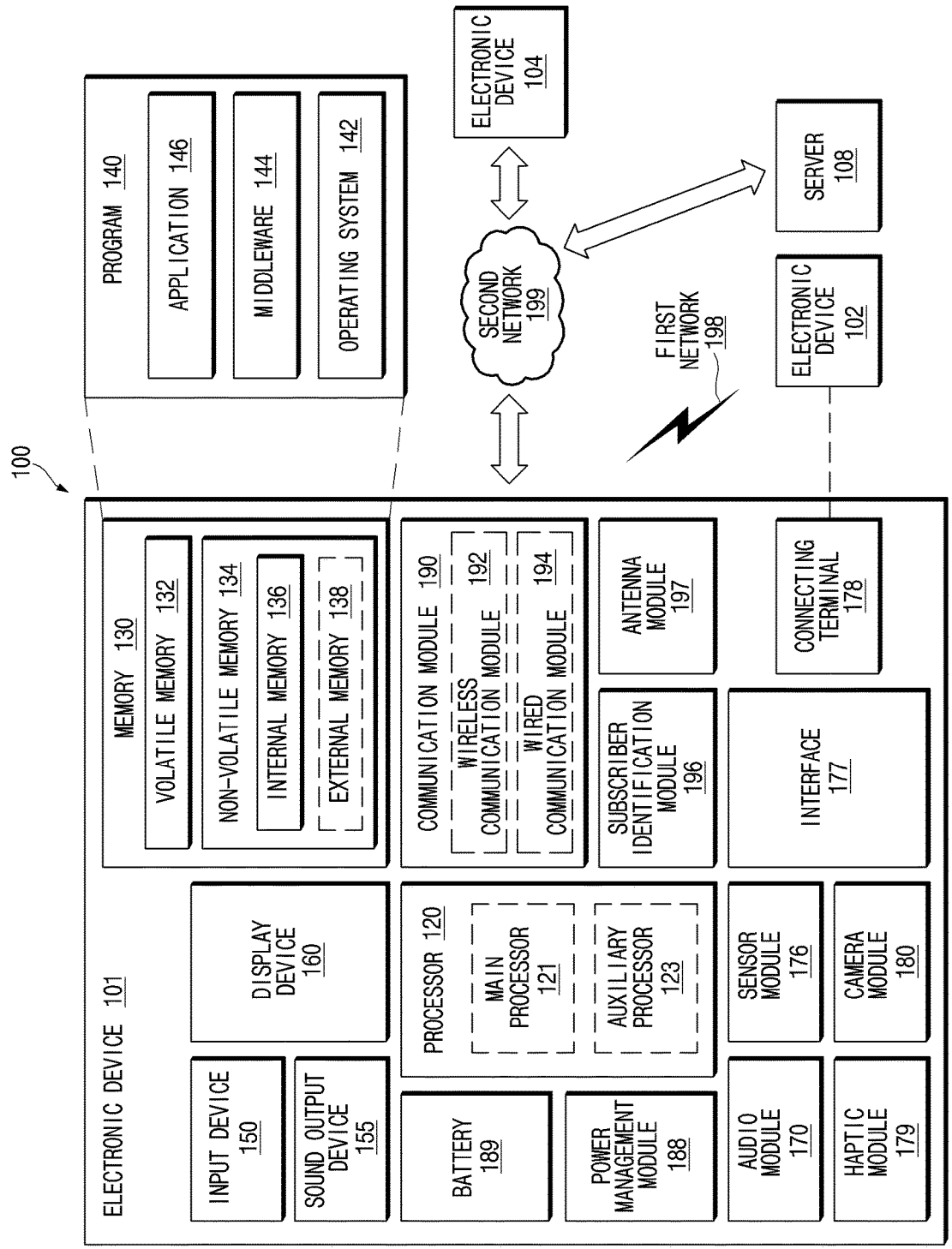
FIG. 1 is a block diagram illustrating an electronic device 101 in a network environment 100 according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
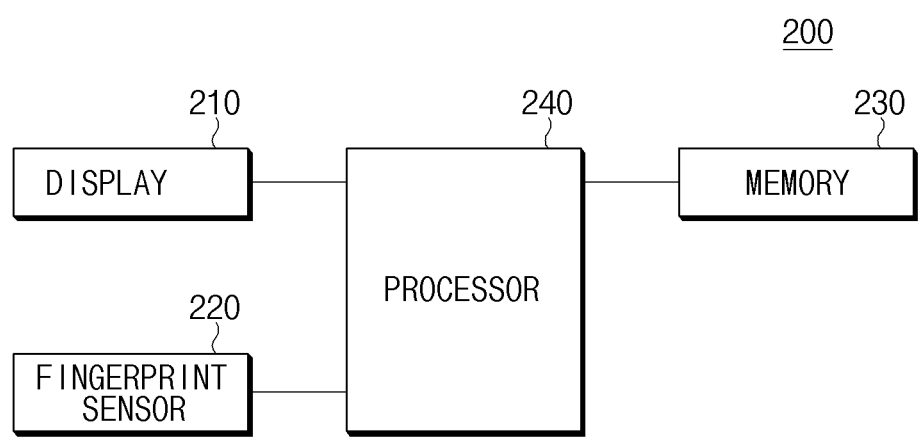
FIG. 2 is a block diagram illustrating an electronic device, according to an embodiment.

FIG. 2 is a block diagram illustrating an electronic device, according to an embodiment.

According to an embodiment, an electronic device 200 may include a display 210, a fingerprint sensor 220, a memory 230, and a processor 240.

According to an embodiment, the display 210 may include a cover glass (not illustrated) and a panel (e.g., a display panel) of the display 210. For example, the panel of the display 210 may be disposed under the cover glass. According to certain embodiments, a protective film may be attached to the cover glass or the display panel. According to an embodiment, the display 210 (e.g., the display panel) may emit light. For example, the light emitted from the display 210 may be reflected from an external object of the electronic device 200 and may be incident to the fingerprint sensor 220. For example, the distance between a contact part to the external object, and the fingerprint sensor 220 may vary depending on whether the protective film is attached. According to certain embodiments, the display 210 may include the display device 160 of FIG. 1.

According to an embodiment, the fingerprint sensor 220 may obtain an image based on the incident light. For example, when the light emitted from the display 210 is reflected from the external object (e.g., the finger or the fingerprint) and incident to the fingerprint sensor 220, the fingerprint sensor 220 may obtain a fingerprint image based on the incident light. According to an embodiment, the fingerprint sensor 220 may include a "fingerprint on display" (FOD) fingerprint sensor 220 disposed at a lower end of the display 210. According to an embodiment, the fingerprint sensor 220 may include an optical fingerprint sensor 220. For example, the optical fingerprint sensor 220 may determine the state or quality of an image obtained depending on a focal length (e.g., the distance between the object contact to the display 210 of the electronic device 200 and the fingerprint sensor 220). According to certain embodiments, the fingerprint sensor 220 may further include at least a portion of the sensor module 176 of FIG. 1.

According to an embodiment, the memory 230 may store a fingerprint image obtained through the fingerprint sensor 220 or a reference image. According to an embodiment, the reference image may be a fingerprint image, which is previously stored (e.g., registered) for a particular user. According to an embodiment, the memory 230 may store information associated with the feature points of the fingerprint image. For example, the memory 230 may aggregate and store information associated with feature points of a fingerprint image of a particular user, whenever the fingerprint image for the particular user is obtained under the control of the processor 240. According to certain embodiments, the memory 230 may further include at least a portion of the memory 130 of FIG. 1.

According to an embodiment, the processor 240 may recognize the feature points of the fingerprint image obtained through the fingerprint sensor 220. For example, the feature points of the fingerprint image may include at least of a ridge, a valley, a bifurcation, or an ending.

According to an embodiment, the processor 240 may compare feature points of the fingerprint image and feature points of the reference image which is previously stored. For example, the reference image may be a fingerprint image, which is previously stored, of a user. For example, the processor 240 may perform a fingerprint registration process to register (store) the fingerprint image of the user as the reference image.

According to an embodiment, the processor 240 may recognize the variation in the distance between the surface (e.g., the surface of the cover glass or the surface of the protective film attached to the cover glass), which makes contact with the external object, of the electronic device 200 and the fingerprint sensor 220, based on the comparison result between the feature point of the fingerprint image and the feature point of the reference image. For example, the protective film may be attached to the cover glass. In this case, the distance between the surface, which makes contact with the external object, and the fingerprint sensor 220 may be changed by the thickness of the protective film. For example, when the distance between a part making contact with the external object and the fingerprint sensor 220 is changed, the quality (e.g., contrast, saturation, or sharpness) of a fingerprint image obtained through the fingerprint sensor 220 may be varied. Accordingly, the performance of recognizing the fingerprint may be varied.

According to an embodiment, a surface of the cover glass may be a surface, which makes contact with the external object, of the cover glass. According to an embodiment, a surface, which is attached to the cover glass, of the protective film may be a surface, which is attached to the cover glass and makes contact with the external object, of the protective film According to an embodiment, the processor 240 may recognize the variation in the distance between the surface, which makes contact with the external object, of the electronic device 200 and the fingerprint sensor 220, when the distance between a plurality of feature points of the fingerprint image is substantially uniformly changed with respect to the distance between a plurality of feature points of the reference image. For example, when the distance between the feature points of the fingerprint image is irregularly changed, the fingerprint of the user is temporarily distorted while the fingerprint of the user makes contact with the surface of the electronic device 200, or the fingerprint of the user may make contact with the electronic device 200 with irregular force. For example, when the distance between the feature points is uniformly changed may be when the distance between the finger of the user and the fingerprint sensor 220 is changed without the erroneous input of the fingerprint of the user. For example, when the distance between the feature points of the fingerprint image is uniformly changed, the electronic device 200 may recognize the foal length (e.g., the distance between the surface of the electronic device 200 and the fingerprint sensor 220) of the fingerprint sensor 220 as being changed and may determine the variation of the focal length.

According to an embodiment, the processor 240 may recognize the distance between the surface, which makes contact with the external object, of the electronic device 200 and the fingerprint sensor 220, based on the angle of view of the fingerprint sensor 220, the distance between at least two feature points of the fingerprint image, and the distance between at least two feature points, which correspond to the at least two feature points of the fingerprint image, of the reference image. According to an embodiment, the processor 240 may recognize the variation in the distance between the surface of the electronic device 200 and the fingerprint sensor 220, based on a real reference distance value, which is previously specified, of the surface of the electronic device 200 and the variation rate of the distance between the feature points of the fingerprint image.

According to an embodiment, the processor 240 may recognize the fingerprint based on the variation in the distance between the surface, which makes contact with the external object, of the electronic device 200 and the fingerprint sensor 220.

According to an embodiment, the processor 240 may correct at least one of brightness, saturation, or sharpness of the fingerprint image based on the variation in the distance between the surface, which makes contact with the external object, of the electronic device 200 and the fingerprint sensor 220. For example, the processor 240 may divides each of a correction degree for at least one value of characteristics (brightness, saturation, sharpness) of an image and the variation in distance, into a plurality of steps, and may match the steps of the correction degree to the steps of the variation in the distance. For example, the processor 240 may apply a different correction value to the fingerprint image depending on the variation in the distance, based on information obtained as the steps of the correction degree and the steps of the variation in the distance are matched to each other. For example, according to an embodiment, the processor 240 may recognize a fingerprint based on the corrected fingerprint image.

According to an embodiment, the processor 240 may adjust the number of times or the period of recognizing a fingerprint based on the variation in the distance between the surface, which makes contact with the external object, of the electronic device 200 and the fingerprint sensor 220. For example, the processor 240 may obtain a fingerprint image by the set number of times in a set cycle, and may determine whether the obtained fingerprint image is matched to the reference image (the fingerprint image registered by the user) to determine whether the fingerprint is successfully recognized. For example, the processor 240 may increase a fingerprint recognition rate by changing the cycle of recognizing a fingerprint or increasing the number of times of recognizing fingerprint recognition, when the surface of the electronic device 200 is away from the fingerprint sensor 220.

According to an embodiment, the processor 240 may adjust the brightness or the wavelength (color) of light emitted from a light source of the display panel to obtain the fingerprint image based on the variation in the distance between the surface, which makes contact with the external object, of the electronic device 200 and the fingerprint sensor 220. For example, the quality of the fingerprint image obtained depending on the distance to the object and the brightness of the light may be varied because the image is obtained based on the light reflected from the object and incident. For example, the processor 240 may increase the brightness of the light emitted from the light source of the display panel or may emit light in brighter color, when the distance between the surface (that is, the object) of the electronic device 200 and the fingerprint sensor 220 is increased.

According to an embodiment, the processor 240 may provide a notification associated to the variation in the distance, based on the variation in the distance between the surface, which makes contact with the external object, of the electronic device 200 and the fingerprint sensor 220. For example, the processor 240 may provide a notification representing that the distance between the surface of the electronic device 200 and the fingerprint sensor 220 is increased or decreased, through at least one of the display 210 (e.g., the display device 160 of FIG. 1), the speaker (e.g., the sound output device 155 of FIG. 1), or a motor (e.g., the haptic module 179 of FIG. 1). According to an embodiment, the processor 240 may provide an interface allowing a user to additionally register a new reference image (the fingerprint of the user) together with the notification for the variation in the distance.

According to an embodiment, the processor 240 may replace or alter the reference image based on the information associated with the feature point of the fingerprint image. For example, the processor 240 may determine whether the obtained fingerprint image is the image of the fingerprint of the user the same as that of the reference image, by comparing the feature point of the fingerprint image with the feature point of the reference image. For example, when a fingerprint image having a magnification different from that of the reference image is continuously obtained even though the reference image and the obtained fingerprint image are for the fingerprint of the same user, the processor 240 may substitute the reference image with a fingerprint image newly obtained, or may alter the reference image based on the fingerprint image which is newly obtained. For another example, when a fingerprint image having a magnification different from that of the reference image is continuously obtained, the processor 240 may provide, to a user, a notification allowing the registration of a new reference image (that is, the new fingerprint of the user).

According to an embodiment, the processor 240 may receive a user input including information associated with the distance between the surface, which makes contact with the external object, of the electronic device 200 and the fingerprint sensor 220. For example, the processor 240 may receive a user input including information on a protective film attached to the cover glass through an input device (not illustrated) (the input device 150 of FIG. 1). For example, the information on the protective film may include at least one of information on a product name, a material, an area, a thickness, or an attachment position of the protective film. According to an embodiment, the processor 240 may recognize a fingerprint based on information (e.g., information on the protective film), which is associated with the distance between the surface, which makes contact with the external object, of the electronic device 200 and the fingerprint sensor 220 and received from a user. For example, when the information on the protective film is received from the user, the processor 240 may recognize the distance between the surface, which makes contact with the external object, of the electronic device 200 and the fingerprint sensor 220 based on the information on the protective film, and may set a filter value for processing an image obtained through the fingerprint sensor 220.

According to certain embodiments, the processor 240 may further include at least a portion of the processor 120 of FIG. 1.

According to certain embodiments, the electronic device 200 may further include at least some components included in the electronic device 101 of FIG. 1.

Figure 3:
FIG. 3 is a view illustrating a fingerprint image, according to an embodiment.

FIG. 3 illustrates a fingerprint image 300, according to an embodiment.

According to an embodiment, the fingerprint image may include at least one feature point. For example, the feature point may include at least one of a ridge 301, a valley 303, a bifurcation 305, and an ending 307. For example, the ridge 301 may refer to a raised line. For example, the valley 303 may refer to as recess between two ridges 301. For example, the bifurcation 305 may refer to as a division of a ridge 301 into two parts. For example, the ending 307 may refer to a point where the ridge 301 terminates.

Because a person has a unique fingerprint, the fingerprint image 300 obtained from the same person may include at least one feature point having the substantially same shape or pattern.

According to an embodiment, a match in state between a present fingerprint and a reference fingerprint may include the shape of the ridge 301, the positions of the bifurcation 305 and the ending 307, and/or a number of bifurcations 305 and endings 307. These factors may be calculated into a score based on the respective feature point(s) included in the fingerprint image, and the fingerprint image 300 may be determined to have a matching shape or pattern as that of the reference image, when the score satisfies a threshold value.

According to an embodiment, the electronic device 200 may recognize at least one feature point included in the obtained fingerprint image 300, and may recognize, based on at least one recognized feature point, the variation in the distance between the surface (e.g., a display panel making contact with the object, a cover glass, or a protective film), which makes contact with the external object, of the electronic device and the fingerprint sensor. According to certain embodiments, the electronic device may recognize a fingerprint based on the variation in the distance between the surface, which makes contact with the object, of the electronic device, and the fingerprint sensor, thereby improving a fingerprint recognition rate.

Figure 4A:
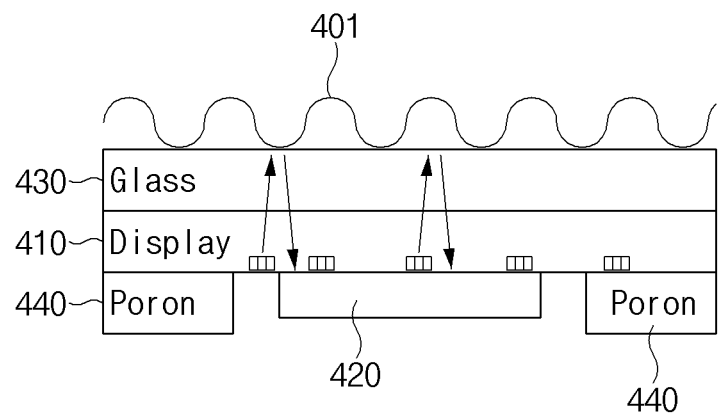
FIGS. 4A and 4B are view illustrating an operation of an electronic device, according to an embodiment.

FIG. 4A is a view illustrating the operation of an electronic device, according to an embodiment.

According to an embodiment, the electronic device may include a cover glass 430, a display panel 410, a fingerprint sensor 420, and a support structure 440.

According to an embodiment, the display panel 410 may be disposed under the cover glass, and the fingerprint sensor 420 may be disposed at one area under the display panel 410. According to an embodiment, the fingerprint sensor 420 may include a "fingerprint on display" (FOD) fingerprint sensor 420. According to an embodiment, the support structure 440 (e.g., a poron) may be disposed under the edge of the display panel 410. For example, the support structure 440 may support the display panel 410, and the fingerprint sensor 420 may be disposed in an inner space of the electronic device. According to an embodiment, a gap may be defined between the display panel 410, the fingerprint sensor 420, and the support structure 440 (not illustrated).

According to an embodiment, the display panel 410 may include an "on cell touch" AMOLED (OCTA) or an "in cell touch" panel. According to an embodiment, the fingerprint sensor 420 may include at least one light source (e.g., R, G, or B light source). For example, the fingerprint sensor 420 may emit light toward the cover glass 430 (e.g., towards an exterior of the electronic device) through the light source. According to an embodiment, the light emitted from the display panel 410 may be emitted to the external environment of the electronic device through the cover glass 430. According to an embodiment, the light emitted from the display panel 410 may be reflected from an external object 401 (e.g., a finger) outside the electronic device, or from a surface in contact with the external object. The reflected light may be incident to the fingerprint sensor 420.

According to an embodiment, the fingerprint sensor 420 may obtain an image based on the reflected light incident to the fingerprint sensor 420. For example, the fingerprint sensor 420 may obtain a fingerprint image of the external object 401 (e.g., the finger) contacting the surface of the electronic device. According to an embodiment, the fingerprint sensor 420 may include a "fingerprint on display" (FOD) fingerprint sensor 420. For example, in general, the FOD-type optical fingerprint sensor 420 may obtain an image based on light transmitted through the display panel 410 and process an image obtained based on the focal length. Accordingly, in the FOD-type optical fingerprint sensor 420, the focal length (e.g., the distance between the surface, which makes contact with the external object, of the electronic device and the fingerprint sensor 420) may exert a significant influence on the performance (e.g., the fingerprint recognizing performance) of obtaining an image.

Figure 4B:
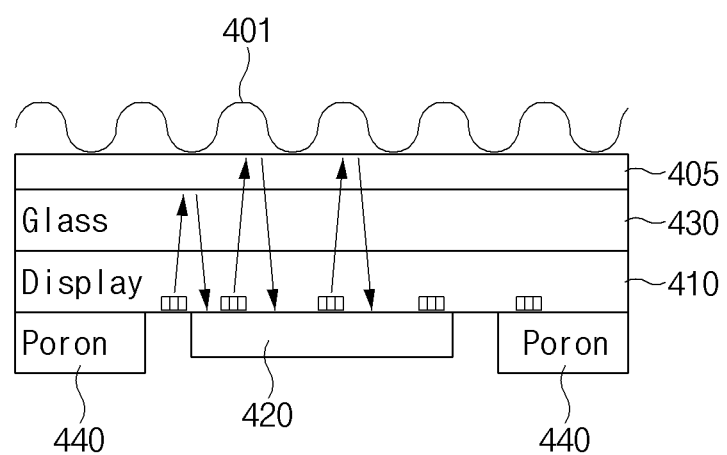

For example, referring to FIG. 4B, a protective film 405 may be attached to the cover glass 430 of the electronic device. For example, when the protective film 405 is attached, a variation will result in the distance between the external object 401 (e.g., finger) making contact with the surface of the electronic device and the fingerprint sensor 420. For example, the distance between the external object 401 and the fingerprint sensor 420 is increased when the protective film 405 is attached to the cover glass 405 as in FIG. 4B, as compared to when the protective film 405 is not attached to the cover glass 430 as in FIG. 4A due to the thickness of the protective film 405. For another example, when the display panel 410 is pushed to an outer portion of the electronic device due to swelling occurring in an inner part (e.g., a battery) in the electronic device, the distance between the cover glass 430, which makes contact with the external object 401, and the fingerprint sensor 420 may be increased or reduced due to the internal cause or external cause (e.g., the display panel is bent due to the impact). For example, because the fingerprint sensor 420 obtains an image based on light reflected from the external object 401 and incident thereto, an influence may be exerted on the state or quality of an image obtained based on a focal length (e.g., the distance between the external object 401 and the fingerprint sensor 420). For example, when the distance between the external object 401 making contact with the electronic device and the fingerprint sensor 420 is changed due to the attachment of the protective film 405 or the internal cause (e.g., swelling) of the electronic device, as an error occurs in initial setting (e.g., the focal length) associated with the fingerprint sensor 420, the fingerprint recognition rate for the external object 401 may be reduced and the operation of repeatedly recognizing the fingerprint may be performed.

According to an embodiment, the electronic device may recognize the feature point of the fingerprint image obtained through the fingerprint sensor 420, and may recognize the variation in the distance between the surface, which makes contact with the external object 401, of the electronic device and the fingerprint sensor 420, based on information associated with the feature point of the fingerprint image. For example, the electronic device may compare the fingerprint image with the reference image (e.g., the fingerprint image, which is previously stored (registered), of the user) and may recognize the variation in the distance between the surface of the electronic device and the fingerprint sensor 420 based on the comparison result. For example, the same user may have the substantially same shape in the feature point of the fingerprint image. For example, when the feature point of the fingerprint image obtained through the fingerprint sensor 420 corresponds to the feature point of the reference image, the fingerprint image and the reference image correspond to the fingerprint of the same user. When the feature point of the fingerprint image is substantially uniformly changed with respect to the feature point of the reference image (e.g., when the distances among at least three feature points are uniformly changed), the distance between the surface (e.g., the surface of the cover glass or the surface of the protective film) of the electronic device and the fingerprint sensor 420 may be determined based on the variation between the feature point of the fingerprint image and the feature point of the reference image. For example, the electronic device may determine whether the distance between a plurality of feature points of the fingerprint image is substantially uniformly changed with respect to the distance between a plurality of corresponding feature points of a reference image. For example, when first, second, and third feature points of the fingerprint image correspond to the fourth, fifth, and sixth feature points of the reference image, respectively, the electronic device may compare the distance between the first feature point and the second feature point of the fingerprint image and the distance between the second feature point and the third feature point of the fingerprint image, with the distance between the fourth feature point and the fifth feature point of the reference image and the distance between the fifth feature point and the sixth feature point, respectively. For example, the fingerprint sensor 420 may have a specified angle of view, and the electronic device may recognize the distance between the surface of the electronic device and the fingerprint sensor 420 or the variation in the distance depending on the variation (e.g., the magnification of the fingerprint image to the reference image) of the fingerprint image based on the reference image.

According to certain embodiments, the electronic device may recognize a fingerprint based on the variation in the distance between the surface of the electronic device and the fingerprint sensor 420, thereby improving a fingerprint recognition rate. For example, the electronic device may adjust the number of times or the period of recognizing a fingerprint, correct the fingerprint image, or replace or alter the reference image, based on the variation in the distance between the surface of the electronic device and the fingerprint sensor 420, thereby improving the fingerprint recognition rate.

Figure 5:
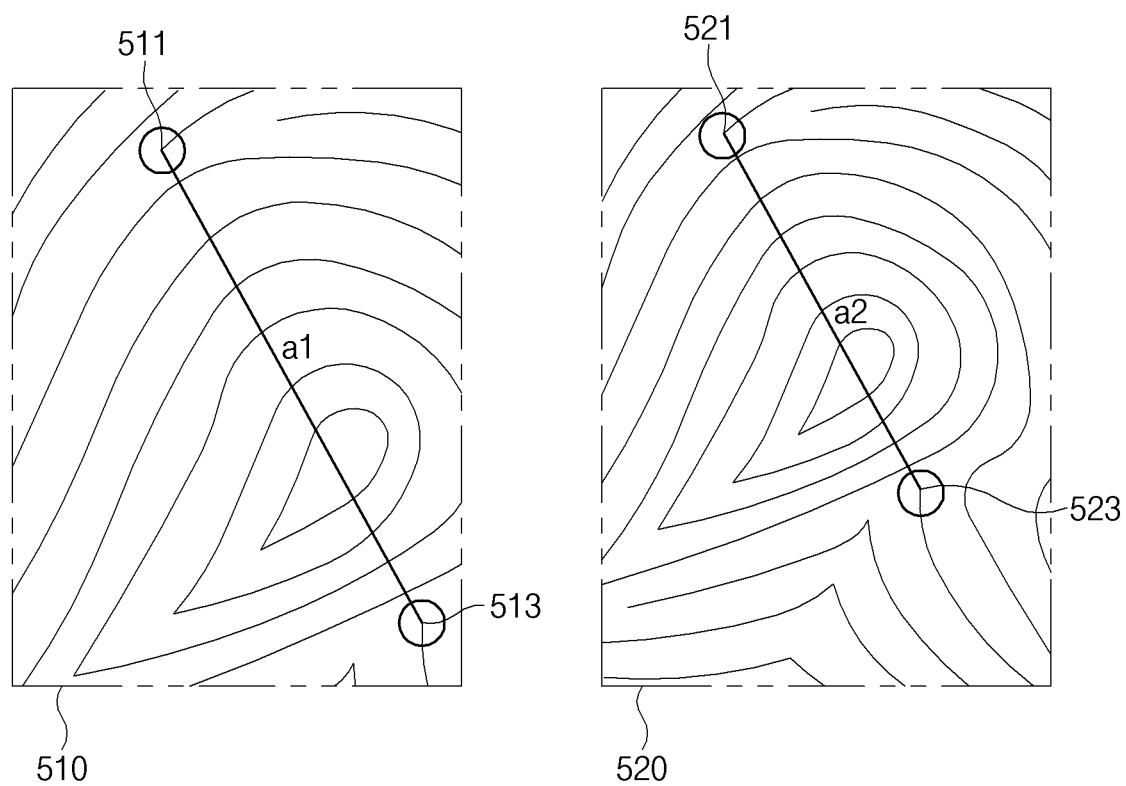
FIG. 5 is a view illustrating an operation of recognizing feature points of a fingerprint image, according to certain embodiments.

FIG. 5 is a view illustrating an operating of recognizing a feature point of a fingerprint image, according to certain embodiments. For example, a first fingerprint image 510 and a second fingerprint image 520 are examples of fingerprint images obtained when the distance between an object making contact with the surface of the electronic device and the fingerprint sensor is changed. According to an embodiment, the first fingerprint image 510 may be a reference image (i.e., a fingerprint image of a user which is previously registered).

According to certain embodiments, the fingerprint images 510 and 520 may include one or more feature points 511, 513, 521, and 523. For example, the first fingerprint image 510 and the second fingerprint image 520 may be fingerprint images for a finger of the same user. In this case, the first fingerprint image 510 may include at least one feature point corresponding to at least one feature point of the second fingerprint image 520. For example, the first fingerprint image 510 may include two endings 511 and 513, and the second fingerprint image 520 may include two endings 521 and 523 corresponding to the two endings 511 and 513, respectively. According to an embodiment, the electronic device may determine whether the fingerprint images belong to the same user, based on feature points of the fingerprint images. For example, the first fingerprint image 510 and the second fingerprint image 520 may have different magnifications depending on focal lengths (e.g., the distances between the fingers and the fingerprint sensor), even though the first fingerprint image 510 and the second fingerprint image 520 belong to the same user (the same finger). For example, the first fingerprint image 510 may differ from the second fingerprint image 520 in the distance between feature points (a ridge, a valley, a bifurcation, or an ending) and the length of each feature point. For example, the electronic device may obtain the first fingerprint image 510 when the protective film is not attached to the cover glass, and may obtain the second fingerprint image 520 when the protective film is attached to the cover glass (in which the focal length of the fingerprint sensor is thereby increased). For example, the distance between the two endings 511 and 513 of the first fingerprint image 510 may be longer than the distance between the two endings 521 and 523 of the second fingerprint image 520.

For example, when the first fingerprint image 510 is the reference image, the ratio of the distance "a1" between the two endings 511 and 513 of the first fingerprint image 510 to the distance "a2" between the two endings 521 and 523 of the second fingerprint image 520 may have the relationship, which is shown as in following Equation 1, with a real distance corresponding to the distance in the fingerprint image.

$$a1: a2 = \text{default distance}:(\text{default distance}+\text{variation in distance}) \qquad \text{Equation 1}$$

According to an embodiment, a default distance may be a previously specified value in terms of a mechanical design. For example, the default value may be previously specified to a real distance value corresponding to an image obtained by a fingerprint sensor. For example, the default value may represent a real value on a surface (e.g., cover glass) of an electronic device, which corresponds to arbitrary distances (for example, diagonal lengths of the whole fingerprint images when the fingerprint images 510 and 520 have rectangular shapes, or diameters of the whole fingerprint image when the fingerprint images 510 and 520 have a circular shape) in the fingerprint images 510 and 520 obtained by the fingerprint sensor.

According to an embodiment, the electronic device may detect the variation in the distance through the calculation of Equation 1, and may recognize the variation in the focal length (the distance between the surface of the electronic device and the fingerprint sensor) of the fingerprint sensor based on the variation in the distance.

Figure 6A:
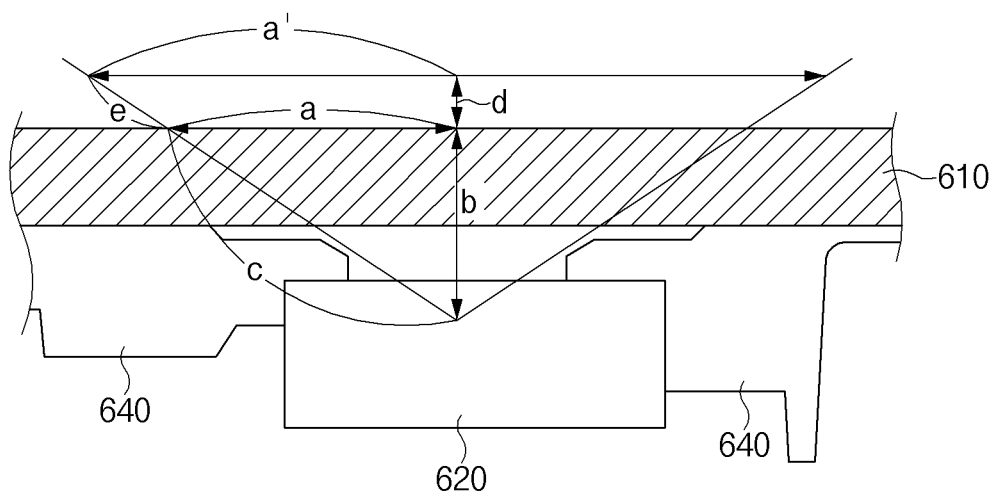
FIGS. 6A and 6B are view illustrating an operation of an electronic device, according to an embodiment.
Figure 6B:
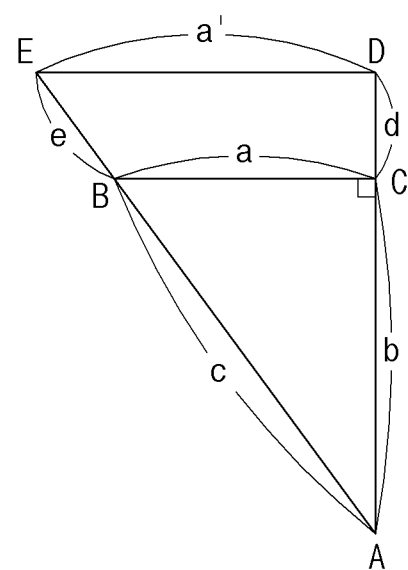

FIGS. 6A and 6B are views illustrating an operation of an electronic device, according to an embodiment.

Referring to FIG. 6A, according to an embodiment, an electronic device may include a display 610, a support structure 640, and a fingerprint sensor 620. For example, the display 610 may include a cover glass and a display panel. For example, the protective film may be attached to the display 610. According to an embodiment, a gap may be formed between the display 610 and the fingerprint sensor 620.

According to an embodiment, the fingerprint sensor 620 may have a specified angle of view. For example, the fingerprint sensor 620 may obtain an image of an external object, which makes contact with the surface of the electronic device, within the specified angle of view depending on a focal length. For example, when a protective film is not attached to the display 610, the fingerprint sensor 620 may obtain a fingerprint image of the external object making contact with an area (2*a) within the specified angle of view on the display 610. For another example, when a protective film having the thickness of "d" is attached to the display 610, the fingerprint sensor 620 may obtain the fingerprint image of the external object making contact with the area (2*a') within the specified angle of view. For example, even though obtaining fingerprint images for a physical body (e.g., a finger) of the same user, the fingerprint sensor 620 may obtain fingerprint images having different magnifications due to the different focal lengths (e.g., the distances between the physical body of the user and the fingerprint sensor 620).

Referring to FIG. 6B, for example, the initial focal length (e.g., the distance "b" between the surface of the display 610 and the fingerprint sensor 620) of the fingerprint sensor 620 may be set in terms of design. For another example, an area (e.g., 2*a) of the display 610 may be set corresponding to an image obtained by the fingerprint sensor 620.

For example, on the assumption that the angle of view of the fingerprint sensor 620 is "A" in FIG. 6B, Equation 2 is satisfied.

$$\tan A = a/b \qquad \text{Equation 2}$$

For example, when the angle "A" of view of the fingerprint sensor 620 and the length "a" of the surface of the display 610 are known, the focal length "b" of the fingerprint sensor 620 may be found. When the angle "A" of the fingerprint sensor 620 and the focal length "b" of the fingerprint sensor 620 are known, the length "a" of the surface of the display 610 may be found.

According to an embodiment, the electronic device may recognize a feature point from a fingerprint image obtained through the fingerprint sensor 620 and may detect the variation in the focal length (e.g., the distance between the surface, which makes contact with the external object, of the electronic device and the fingerprint sensor 620) of the fingerprint sensor 620 based on a result obtained by consecutively measuring the feature point. According to certain embodiments, the electronic device may correct the fingerprint image based on the variation in the distance between the surface of the electronic device and the fingerprint sensor 620, and may improve fingerprint recognition performance by recognizing the fingerprint using the corrected fingerprint image. For example, the electronic device may adjust a filter value (e.g., a correction value) to correct the fingerprint image based on the variation in the distance between the surface of the electronic device and the fingerprint sensor 620. For example, the electronic device may correct the brightness, saturation, or sharpness of the obtained fingerprint image based on variation in the distance between the surface of the electronic device and the fingerprint sensor 620. For example, the electronic device may adjust the brightness of light emitted through a light source of the display 610 or the wavelength (e.g., the color) of the light, to obtain the fingerprint image based on the variation in the distance between the surface of the electronic device and the fingerprint sensor 620. For example, the electronic device may adjust the number of times or the period of recognizing a fingerprint based on the variation in the distance between the surface of the electronic device and the fingerprint sensor 620.

According to an embodiment, the electronic device may include a cover glass, a display panel disposed under the cover glass, a fingerprint sensor disposed under the display panel, and a processor operatively connected to the display panel and the fingerprint sensor.

According to an embodiment, the processor may obtain a fingerprint image for an external object making contact with a surface of the electronic device through the fingerprint sensor, recognize a feature point of the fingerprint image, compare the feature point of the fingerprint image with a feature point of a reference image, which is previously stored, recognize the variation in the distance between the surface and the fingerprint sensor based on the compared result, and recognize the fingerprint based on the variation in the distance.

According to an embodiment, the feature point may include at least one of a ridge, a valley, a bifurcation, and an ending of the fingerprint image or the reference image.

According to an embodiment, the reference image may be a fingerprint image, which is previously stored (registered), of a user.

According to an embodiment, the processor may replace or alter the reference image based on information associated with the feature point of the fingerprint image.

According to an embodiment, the processor may provide a notification associated with the variation in the distance, based on the variation in the distance.

According to an embodiment, the processor may recognize the variation in the distance between the surface and the fingerprint sensor based on an angle of view of the fingerprint sensor, a distance between at least two feature points of the fingerprint image, and a distance between at least two feature points, which correspond to the at least two feature points of the fingerprint image, of the reference image.

According to an embodiment, the processor may recognize the variation in the distance between the surface and the fingerprint sensor when a distance between a plurality of feature points of the fingerprint image is substantially uniformly changed with respect to a distance between a plurality of feature points of the reference image.

According to an embodiment, the processor may accumulate and store information associated with the feature point of the fingerprint image in a memory.

According to an embodiment, the processor may recognize the fingerprint by correcting at least one of brightness, saturation, or sharpness of the fingerprint image based on the variation in the distance.

According to an embodiment, the processor may adjust the number of times or a period of recognizing a fingerprint, based on the variation in the distance.

According to an embodiment, the processor may adjust the brightness or wavelength of light of the display panel, which is emitted to obtain the fingerprint image based on the variation in the distance.

According to an embodiment, the processor may receive a user input including information associated with the distance between the surface and the fingerprint sensor, and recognize the fingerprint based on the information.

Figure 7:
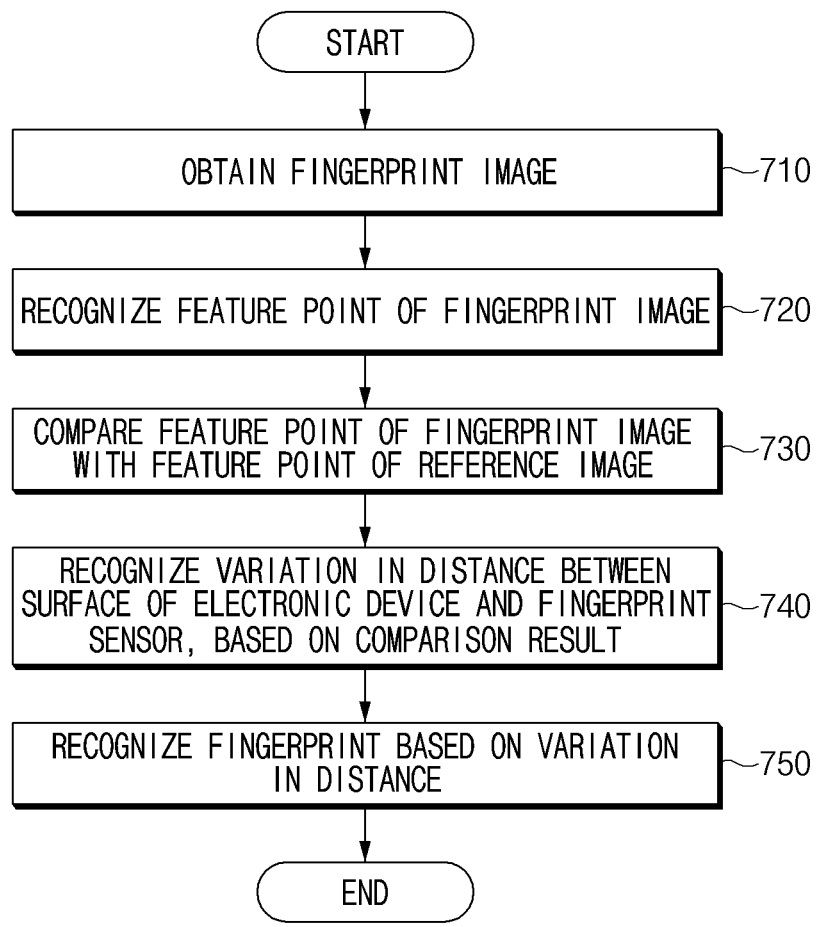
FIG. 7 is a flowchart illustrating a method for recognizing a fingerprint by an electronic device, according to an embodiment.

FIG. 7 is a flowchart illustrating a method for recognizing a fingerprint by an electronic device (e.g., the electronic device 101 of FIG. 1 and the electronic device 200 of FIG. 2), according to an embodiment.

According to an embodiment, in operation 710, the electronic device may obtain a fingerprint image through a fingerprint sensor. For example, the electronic device may emit light through at least one light source included in a display (or a display panel). For example, light emitted from the light source of the display is reflected from an external object making contact with the surface of the electronic device, passes through the display, and incident to the fingerprint sensor. For example, the electronic device may obtain an image (e.g., the fingerprint image) for the external object, based on the light reflected from the external object and incident to the fingerprint sensor.

According to an embodiment, in operation 720, the electronic device may recognize at least one feature point of the fingerprint image. For example, the feature points of the fingerprint image may include, for example, at least one of a ridge, a valley, a bifurcation, or an ending of a fingerprint. For example, the electronic device may recognize the position of at least one feature point included in the fingerprint image, the distance (width) between feature points, the shape of the feature point, and the number of feature points.

According to an embodiment, in operation 730, the electronic device may compare a feature point of the fingerprint image and a feature point of a reference image. According to an embodiment, the reference image may be a fingerprint image, which is previously stored (registered), of a user. For example, the electronic device may compare at least one of the distance between feature points (a ridge, a valley, a bifurcation, or an ending) included in the fingerprint image, the shape of the feature point, or the position of the feature point with at least one of the distance between feature points (a ridge, a valley, a bifurcation, or an ending) included in the reference image, the shape of the feature point, or the position of the feature point, respectively.

According to an embodiment, in operation 740, the processor 240 may recognize (e.g., detect) a variation in the distance between the surface of the electronic device 200 contacting the external object, and the fingerprint sensor 220, when the distance between a plurality of feature points of the fingerprint image is substantially uniformly changed with respect to the distance between a plurality of feature points of the reference image. For example, when the distance between the feature points is uniformly changed, the electronic device may determine that the distance between the contacting surface and the fingerprint sensor 620 has changed resulting in the variation, and may recognize the variation in the distance in response to the determination, rather than identifying the fingerprint has having been erroneously input.

According to an embodiment, in operation 740, the electronic device may detect the variation in the distance between a cover glass and the fingerprint sensor, based on the comparison result. According to an embodiment, the electronic device may recognize the variation in the focal length (e.g., the distance between the surface, which makes contact with the external object, of the electronic device and the fingerprint sensor) of the fingerprint sensor. For example, the surface, which makes contact with the external object, of the electronic device may include the surface of the cover glass or the surface of the protective film attached to the cover glass.

According to an embodiment, the electronic device may recognize the distance between the surface, which makes contact with the external object, of the electronic device and the fingerprint sensor, based on the angle of view of the fingerprint sensor, the distance between at least two feature points of the fingerprint image, and the distance between at least two feature points, which correspond to at least two feature points of the fingerprint image, of the reference image. According to an embodiment, the electronic device may recognize the variation in the distance between the surface of the electronic device and the fingerprint sensor, based on a real reference distance value of the surface of the electronic device, which is previously stored, and the rate of the variation in the distance between the feature points of the fingerprint image.

According to an embodiment, in operation 750, the electronic device may recognize the fingerprint based on the variation in the distance.

According to an embodiment, the electronic device may correct at least one of brightness, saturation, or sharpness of the fingerprint image based on the variation in the distance between the surface, which makes contact with the external object, of the electronic device and the fingerprint sensor. For example, according to an embodiment, the electronic device may recognize the fingerprint based on the corrected fingerprint image.

According to an embodiment, the electronic device may adjust the number of times or the period of recognizing a fingerprint based on the variation in the distance between the surface, which makes contact with the external object, of the electronic device and the fingerprint sensor. For example, the electronic device may obtain a fingerprint image by the set number of times in a set period, and may determine whether the obtained fingerprint image is matched to the reference image (the fingerprint image registered by the user) to determine whether the fingerprint is successfully recognized. For example, the electronic device may increase a fingerprint recognition rate by changing the period of recognizing the fingerprint or increasing the number of times of recognizing the fingerprint, when the surface of the electronic device is away from the fingerprint sensor.

According to an embodiment, the electronic device may adjust the brightness or the wavelength (color) of light emitted from a light source of the display (or the display panel) to obtain the fingerprint image based on the variation in the distance between the surface, which makes contact with the external object, of the electronic device and the fingerprint sensor.

According to an embodiment, the electronic device may receive a user input including information associated with the distance between the surface, which makes contact with an external object, of the electronic device and a fingerprint sensor. For example, the electronic device may receive a user input including information on a protective film attached to a cover glass. For example, the information on the protective film may include at least one of information on a product name, a material, an area, a thickness, or an attachment position of the protective film. According to an embodiment, the electronic device may recognize the fingerprint based on information (e.g., information on the protective film), which is received from the user and associated with the distance between the surface, which makes contact with the external object, of the electronic device and the fingerprint sensor. For example, when the information on the protective film is received from the user, the electronic device may recognize the distance between the surface, which makes contact with the external object, of the electronic device and the fingerprint sensor, based on the information on the protective film and may correct an image obtained through the fingerprint sensor, based on the recognized distance. For example, the electronic device may recognize, based on the information on the protective film, that the distance between the surface of the electronic device and the fingerprint sensor is changed by the thickness of the protective film and may correct the fingerprint image based on the changed distance. The electronic device may recognize the fingerprint based on the corrected fingerprint image to improve a fingerprint recognition success rate.

According to certain embodiments, the electronic device may recognize the fingerprint based on the variation in the distance between the surface, which makes contact with an object, of the electronic device, and the fingerprint sensor, thereby improving a fingerprint recognition rate.

Figure 8:
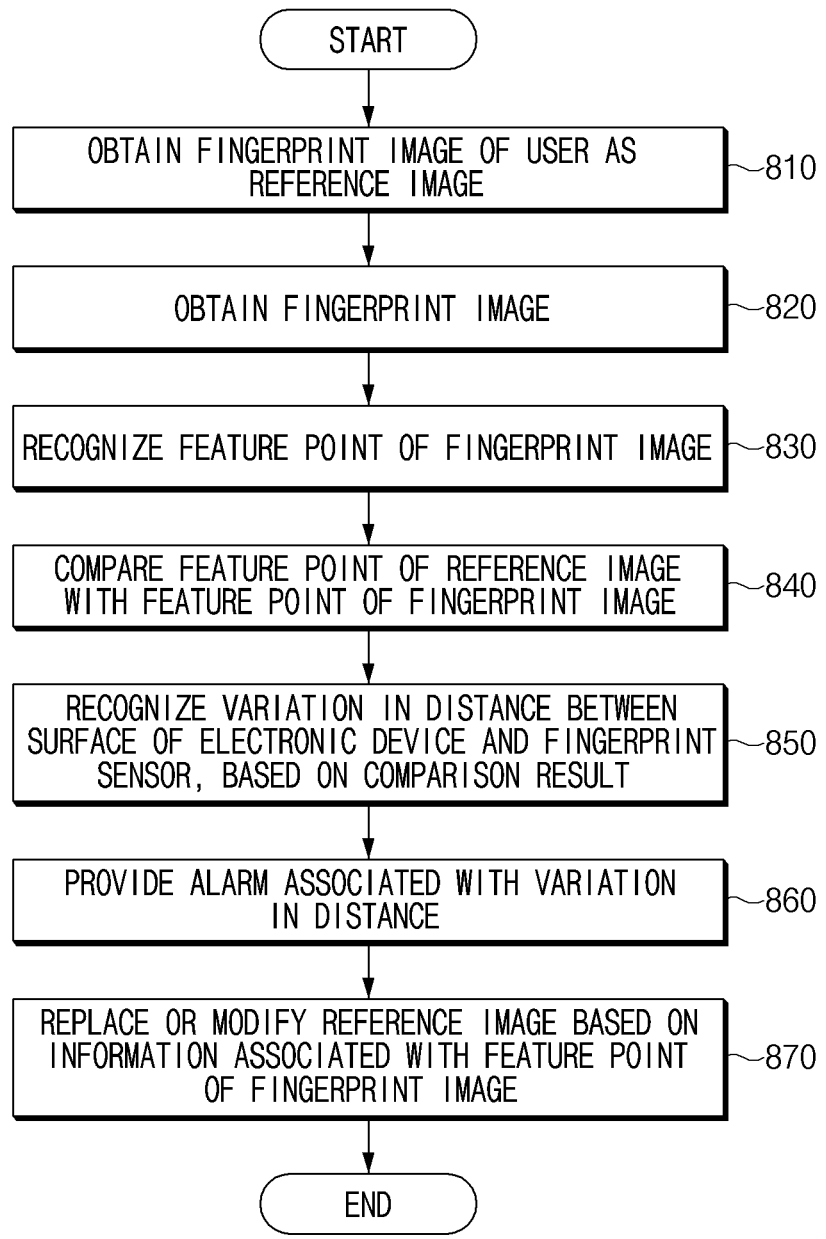
FIG. 8 is a flowchart illustrating a method for recognizing a fingerprint by an electronic device, according to an embodiment.

FIG. 8 is a flowchart illustrating a method for recognizing a fingerprint by an electronic device (e.g., the electronic device 101 of FIG. 1 and the electronic device 200 of FIG. 2), according to an embodiment.

According to an embodiment, in operation 810, the electronic device may obtain a fingerprint image of a user as a reference image. For example, the electronic device may perform a fingerprint registration process to register (store) a new fingerprint image of the user as the reference image.

According to an embodiment, in operation 820, the electronic device may obtain a fingerprint image through a fingerprint sensor. For example, in operation 820, the electronic device may obtain a fingerprint image for security authentication after registration of the reference image.

According to an embodiment, in operation 830, the electronic device may recognize at least one feature point depicted in the fingerprint image. For example, the electronic device may recognize at least one of a ridge, a valley, a bifurcation, or an ending of the fingerprint image.

According to an embodiment, in operation 840, the electronic device may compare the detected feature point of the fingerprint image with a corresponding feature point of the reference image which is previously stored (e.g., preregistered). For example, the electronic device may compare the shape and the position of one or more feature points, which are included in the fingerprint image, the number of the feature points, and the distance between the feature points, with the shape and the position of one or more feature points, which are included in the reference image, the number of the feature points, and the distance between the feature points.

According to an embodiment, in operation 850, the electronic device may detect the variation in the distance between the contacting surface of the electronic device and the fingerprint sensor, based on the comparison result. For example, the electronic device may recognize the variation in distance between a cover glass making contact with the external device and a fingerprint sensor or between a protective film attached to the cover glass and the fingerprint sensor.

According to an embodiment, in operation 860, the electronic device may provide a notification (e.g., an alarm) associated to the variation in the distance, based on the detected variation in the distance between the contacted electronic device surface and the fingerprint sensor. According to an embodiment, the electronic device may provide an interface allowing a user to additionally register a new reference image (the fingerprint of the user) together with the notification for the variation in the distance.

According to an embodiment, the electronic device may replace or alter the reference image based on the information associated with the feature point of the fingerprint image in operation 870. For example, when a fingerprint image having a magnification different from a magnification of the reference image is consecutively obtained even though the reference image and the obtained fingerprint image are determined as belonging to the same user, the processor 240 may replace the reference image with a fingerprint image which is newly obtained, or may alter the reference image based on the fingerprint image which is newly obtained.

According to an embodiment, a method for recognizing a fingerprint by an electronic device may include obtaining a fingerprint image for an external object making contact with a surface of the electronic device through a fingerprint sensor, recognizing a feature point of the fingerprint image, comparing the feature point of the fingerprint image with a feature point of a reference image, which is previously stored, recognizing a variation in a distance between the surface and the fingerprint sensor based on the compared result, and recognizing the fingerprint based on the variation in the distance.

According to an embodiment, the reference image may be a fingerprint image, which is previously registered, of a user.

According to an embodiment, the method may include replacing or altering the reference image based on information associated with the feature point of the fingerprint image.

According to an embodiment, the method may include providing a notification associated with the variation in the distance, based on the variation in the distance.

According to an embodiment, the recognizing of the variation in the distance may include recognizing the variation in the distance between the surface and the fingerprint sensor based on the angle of view of the fingerprint sensor, a distance between at least two feature points of the fingerprint image, and a distance between at least two feature points, which correspond to the at least two feature points of the fingerprint image, of the reference image.

According to an embodiment, the recognizing of the fingerprint may include recognizing the fingerprint by correcting at least one of brightness, saturation, or sharpness of the fingerprint image based on the variation in the distance.

According to an embodiment, the recognizing of the fingerprint may include adjusting the number of times or the period of recognizing the fingerprint, based on the variation in the distance.

According to an embodiment, the method may further include adjusting a brightness or wavelength of light emitted from the display panel to obtain the fingerprint image based on the variation in the distance.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory storage medium" means a tangible device, and does not include a signal (e.g., an electromagnetic wave), but this term does not differentiate between where data is semi-permanently stored in the storage medium and where the data is temporarily stored in the storage medium. For example, "the non-transitory storage medium" may include a buffer where data is temporally stored.

According to an embodiment, a method according to certain embodiments of the disclosure may be included and provided in a computer program product. The computer program product may be traded as a product between a seller and a buyer. The computer program product (e.g., downloadable app)) may be distributed in the form of a machine-readable storage medium (e.g., compact disc read only memory (CD-ROM)), or be distributed (e.g., downloaded or uploaded) online via an application store (e.g., PlayStore™) or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to embodiments disclosed herein, the variation in the distance between the cover glass (the display panel) of the electronic device and the fingerprint sensor may be recognized.

According to embodiments disclosed herein, feature points of a fingerprint image may be recognized and the variation in the distance between the surface and the fingerprint sensor may be recognized based on the feature points of the fingerprint image.

According to embodiments disclosed herein, the fingerprint recognition rate may be increased by recognizing the fingerprint based on the variation in the distance between the display panel and the fingerprint sensor.

Besides, a variety of effects directly or indirectly understood through the disclosure may be provided.

While the disclosure has been shown and described with reference to certain embodiments thereof, it will be understood by those skilled in the art that various changes in form and details may be made therein without departing from the disclosure as defined by the appended claims and their equivalents.

What is claimed is:

1. An electronic device, comprising:
   a cover glass;
   a display panel disposed under the cover glass;
   a fingerprint sensor disposed under the display panel; and
   a processor operatively connected to the display panel and the fingerprint sensor,
   wherein the processor is configured to:
   obtain a fingerprint image from an external object contacting a surface of the electronic device through the fingerprint sensor;
   detect a feature point of the fingerprint image;
   compare the detected feature point of the fingerprint image with a reference feature point from a pre-stored reference image;
   detect a variation in a distance between the surface and the fingerprint sensor, based on a result of the comparison; and
   recognize a fingerprint based on the detected variation in the distance.

2. The electronic device of claim 1, wherein the feature point includes:
   at least one of a ridge, a valley, a bifurcation, and an ending depicted as part of a fingerprint pattern in the fingerprint image or the reference image.

3. The electronic device of claim 1, wherein the reference image includes a previously registered fingerprint image of a user.

4. The electronic device of claim 1, wherein the processor is configured to:
   replace or alter the reference image based on information associated with the feature point of the fingerprint image.

5. The electronic device of claim 1, wherein the processor is configured to:
   provide a notification based on the variation in the distance.

6. The electronic device of claim 1, wherein
   the variation in the distance between the surface and the fingerprint sensor is detected based on:
   an angle of view of the fingerprint sensor, and
   a distance between at least two feature points of the fingerprint image, and
   a distance between at least two feature points of the reference image,
   wherein the at least two feature points of the reference image correspond to the at least two feature points of the fingerprint image.

7. The electronic device of claim 6, wherein the variation in the distance between the surface and the fingerprint sensor is detected when a distance between a plurality of feature points of the fingerprint image is changed with respect to a distance between a plurality of feature points of the reference image.

8. The electronic device of claim 1, further comprising a memory operatively coupled to the processor, wherein the processor is further configured to:
   store information associated with the feature point of the fingerprint image in the memory.

9. The electronic device of claim 1, wherein
   detecting the fingerprint includes altering at least one of a brightness, a saturation, and a sharpness of the fingerprint image based on the detected variation in the distance.

10. The electronic device of claim 1, wherein the processor is further configured to:
    adjust a count of attempts or a time period for attempting recognition of the fingerprint, based on the detected variation in the distance.

11. The electronic device of claim 1, wherein the processor is configured to:
    adjust a brightness or a wavelength of light emitted from the display panel to obtain the fingerprint image based on the detected variation in the distance.

12. The electronic device of claim 1, wherein the processor is further configured to:
    receive a user input indicating a distance between the surface and the fingerprint sensor; and
    wherein the fingerprint is recognized based at least on the indicated distance.

13. A method in an electronic device, the method comprising:
    obtaining, through a fingerprint sensor, a fingerprint image from an external object contacting a surface of the electronic device;
    detecting, using a processor, a feature point of the fingerprint image;
    comparing the detected feature point of the fingerprint image with a feature point of a pre-stored reference image;
    detecting a variation in a distance between the surface of the electronic device and the fingerprint sensor based on a result of the comparison; and
    recognizing the fingerprint based on the detected variation in the distance.

14. The method of claim 13, wherein the reference image includes a previously registered fingerprint image of a user.

15. The method of claim 13, further comprising:
    replacing or altering the reference image based on information associated with the feature point of the fingerprint image.

16. The method of claim 13, further comprising:
    providing a notification based on the variation in the distance.

17. The method of claim 13, wherein the variation in the distance between the surface and the fingerprint sensor is detected based on an angle of view of the fingerprint sensor, and a distance between at least two feature points of the fingerprint image, and a distance between at least two feature points of the reference image, wherein the at least two feature points of the reference image correspond to the at least two feature points of the fingerprint image.

18. The method of claim 13, wherein the fingerprint is recognized by correcting at least one of brightness, saturation, or sharpness of the fingerprint image based on the detected variation in the distance.

19. The method of claim 13, wherein recognizing the fingerprint further includes:
adjusting a count of attempts or a time period for attempting recognition of the fingerprint, based on the detected variation in the distance.

20. The method of claim 13, further comprising:
adjusting brightness or a wavelength of light emitted from a display panel of the electronic device, to obtain the fingerprint image based on the detected variation in the distance.

* * * * *